United States Patent
Barinaga et al.

(10) Patent No.: US 6,834,677 B2
(45) Date of Patent: Dec. 28, 2004

(54) OVER-MOLDED CHECK VALVES FOR FLUID DELIVERY SYSTEMS

(75) Inventors: Louis C. Barinaga, Salem, OR (US); Daniel D. Dowell, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 64 days.

(21) Appl. No.: 10/136,899

(22) Filed: Apr. 30, 2002

(65) Prior Publication Data

US 2003/0201023 A1 Oct. 30, 2003

(51) Int. Cl.[7] ............................................. F16K 15/14
(52) U.S. Cl. ................. 137/846; 137/512.1; 137/844; 251/368
(58) Field of Search ..................... 137/843, 844, 137/845, 846, 512, 512.1, 512.15, 375, 852, 859; 251/331, 368; 347/85, 86, 87

(56) References Cited

U.S. PATENT DOCUMENTS

| | | | | |
|---|---|---|---|---|
| 3,465,786 A | * | 9/1969 | Spisak | 137/516.27 |
| 3,508,576 A | * | 4/1970 | Gross | 137/859 |
| 4,251,053 A | * | 2/1981 | Wurzer | 251/331 |
| 4,514,742 A | * | 4/1985 | Suga et al. | 347/85 |
| 4,677,447 A | * | 6/1987 | Nielsen | 347/87 |
| 5,727,594 A | * | 3/1998 | Choksi | 137/859 |
| 5,833,121 A | * | 11/1998 | Gueret | 222/144.5 |
| 5,936,650 A | * | 8/1999 | Ouchida et al. | 347/89 |
| 5,947,443 A | | 9/1999 | Shellenbarger et al. | |
| 5,992,461 A | | 11/1999 | Gilmore et al. | |
| 6,105,609 A | * | 8/2000 | Polidan et al. | 137/515.7 |
| 6,112,951 A | * | 9/2000 | Mueller | 222/490 |
| 6,116,884 A | | 9/2000 | Rowley et al. | |
| 6,240,962 B1 | * | 6/2001 | Tai et al. | 137/859 |
| 6,267,473 B1 | * | 7/2001 | Smith | 347/85 |
| 6,470,904 B1 | * | 10/2002 | Tai et al. | 137/15.18 |
| 6,550,498 B2 | * | 4/2003 | Miyazawa et al. | 137/859 |
| 2001/0040175 A1 | * | 11/2001 | Bailly | 222/321.9 |
| 2002/0057972 A1 | * | 5/2002 | Barinaga et al. | 417/413.3 |

* cited by examiner

Primary Examiner—Ramesh Krishnamurthy

(57) ABSTRACT

An over-molded fluid control value for use in fluid delivery systems. An embodiment of the fluid control valve includes a rigid substrate having a opening defined therein, and a valve structure fabricated of an elastomeric material. The valve structure is over-molded over at least a portion of the rigid substrate and including a valve portion extending over the opening, the valve portion movable in response to a differential fluid pressure to allow fluid flow.

20 Claims, 4 Drawing Sheets

OVER-MOLDED CHECK VALVES FOR FLUID DELIVERY SYSTEMS

BACKGROUND OF THE DISCLOSURE

A check valve is a valve that allows fluid to flow in one direction and prevents flow in the opposite direction. Check valves are common in industry. For example, the medical industry incorporates check valves in many devices used for the delivery of fluid medications.

Previous check valve designs have used mechanical attachment techniques to create a seal between the valve body and the host parts. These techniques consist of a mechanical joint between two parts that squish the valve between them, creating a seal. The joining techniques include ultrasonic welding, snap fits, adhesives and press fits. The mechanical joining techniques require substantial features in order to create a bond between the two rigid parts. These features result in parts that are relatively large and difficult to pack densely into an assembly.

A duckbill valve structure is a common design that is manufactured in various forms. The name derives from the shape of the valve, which is typically long and tapered. At the end of a tapered shaft, a slit is created to allow fluid flow through the valve.

SUMMARY OF THE DISCLOSURE

An over-molded fluid control valve is disclosed for use in fluid delivery systems. An embodiment of the fluid control valve includes a rigid substrate having a opening defined therein, and a valve structure fabricated of an elastomeric material. The valve structure is over-molded over at least a portion of the rigid substrate and including at least one valve portion extending over the opening, the valve portion movable in response to a differential fluid pressure to allow fluid flow.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE DISCLOSURE

Figure 1:
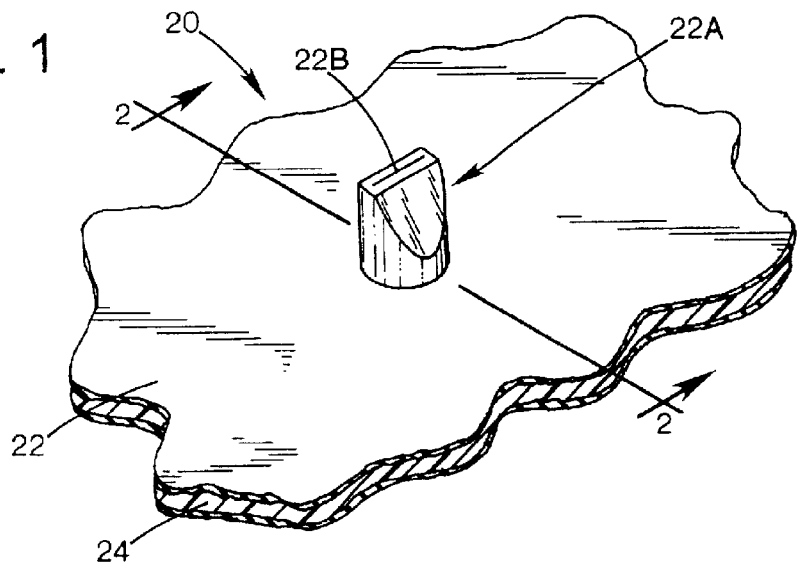
FIG. 1 is an isometric view of an embodiment of an over-molded duckbill check valve structure.
Figure 2:
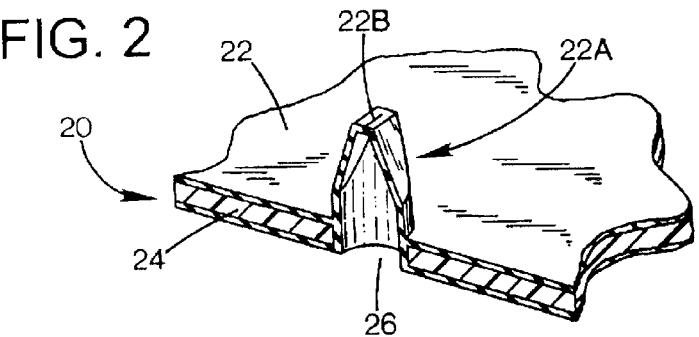
FIG. 2 is an isometric cross-section taken along line 2—2 of FIG. 1.
Figure 3:
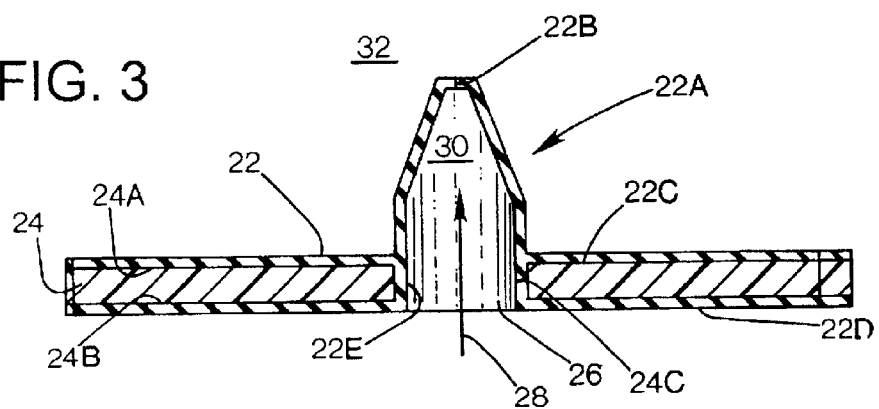
FIG. 3 is a side view of the cross-section of FIG. 2.
Figure 4:
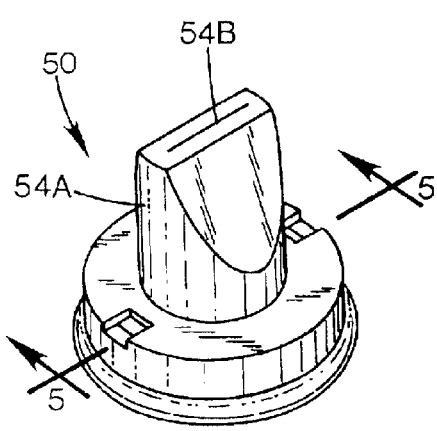
FIG. 4 is an isometric view of a second embodiment of an over-molded duckbill check valve structure.

A first embodiment of an over-molded check valve is a "duckbill" valve, shown in FIGS. 1–3 as valve structure 20, which includes an elastomer layer 22 that is over-molded onto a rigid substrate 24. The elastomer layer 22 is molded to form the long tapered duckbill portion 22A, with a slit 22B formed at the distal end of the duckbill portion. The slit can be made by a blade or lance after the layer is formed, and can be made while the part is still in the mold.

The rigid substrate 24 has an opening 26 formed there through. In this embodiment, the opening 26 is circular, but other shapes can alternatively be employed.

During the over-molding process, the elastomer layer 22 is formed over the top surface 24A and the bottom surface 24B of the substrate, and also over the peripheral wall 24C defining the opening 26. Thus, the layer 22 includes an upper layer portion 22C which is over-molded onto top substrate surface 24A, and a lower layer portion 22D which is over-molded onto bottom substrate surface 24B. The upper and lower layer portions are joined by a layer portion 22E which covers the peripheral wall 24C. The upper and lower layers serve to provide structural integrity of the elastomer layer, with the two layers joined through the opening in the substrate serving to hold the layers onto the substrate during molding. Also, the layers are joined at edges of the substrate and through the substrate openings to eliminate exposed joints between the elastomer and substrate. This prevents ink or fluid from penetrating between the elastomer layers and the substrate. In other embodiments, the lower layer portion 22D may be omitted, and/or the lateral extent of the elastomer layers abbreviated.

Exemplary materials suitable for the substrate 24 include liquid crystal polymer (LCP), PPS and NORYL (TM). Exemplary materials suitable for the elastomer layers include EPDM, santoprene, and thermoplastic elastomers.

In an exemplary application, the height of the valve structure is 10 mm, a base width of 4 mm, a tip length of 3 mm, and a tip width of 1 mm. The wall thickness of the duckbill portion is nominally 0.5 mm. The tapered portion of the duckbill portion 22A has a height of 5 mm, and a taper angle of 30°. The slit 22B is 2 mm long in this embodiment. The foregoing dimensions are by way of illustration only; embodiments with different dimensions can be used.

The direction of fluid flow through structure 20 is indicated by arrow 28 (FIG. 3). A differential pressure between fluid inside the duckbill cavity 30 and fluid on the opposite side of the valve structure at 32 is required to allow fluid to flow in the direction 28; this differential pressure is referred to as a valve "break" or "check" pressure. The break pressure is needed to open the slit 22B and permit fluid flow.

Fluid flow in the opposite direction is prevented by the duckbill geometry, since positive pressure on the exterior of the tapered duckbill portion will tend to force the slit closed. The break pressure is affected by various factors, including the length of the duckbill portion, the elastomer modulus, the slit length.

The rigid substrate 24 will typically be a host part that already exists in an assembly. This configuration allows for a minimum of parts. Multiple valves can be molded onto an existing part, eliminating the need for extra parts to create additional valves.

Over-molding is a well known, two step fabrication process, in which a rigid substrate, such as substrate 24, is first formed, typically by injection molding. Thereafter, in a second step, a layer of elastomer, such as layer 22, is molded onto the substrate, typically by thermoset or thermoplastic injection molding, forming a membrane structure.

Two over-molding methods are commonly used. The first is used for over-molding onto rigid thermoplastics. In this process, a rigid thermoplastic piece, is molded. A thermoplastic elastomer is then over-molded after a section of movable coring is retracted. The thermoplastic part may be required to endure high mold temperatures during the second step of this process.

The second method of over-molding is used to over-mold thermoset elastomer onto either a rigid thermoset or thermoplastic piece. In this process, a rigid thermoplastic piece is molded using traditional injection molding techniques. The part is then transferred to a second mold cavity wherein the thermoset elastomer is injected onto it. Again, the rigid piece may endure high mold temperatures during the over-mold process.

Either of these exemplary over-molding processes, as well as other over-molding processes, could be employed in the fabrication of the check valve structure 20.

A second exemplary embodiment of a check valve is shown in FIGS. 4–7. This check valve structure 50 has some similarities to the first embodiment, but is designed to be a separate part that can be pressed onto an assembly.

Figure 5:
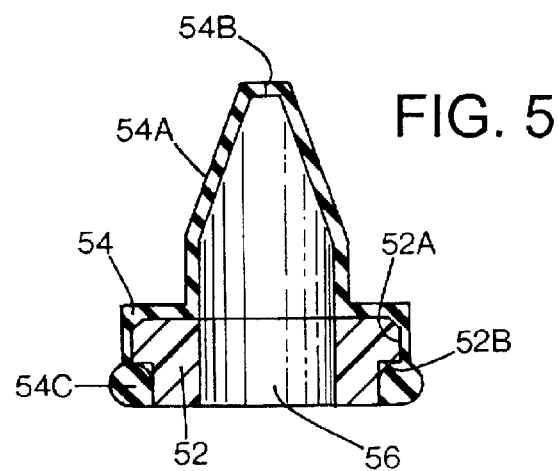
FIG. 5 is a cross-section view taken along line 5—5 of FIG. 2.

The valve structure 50 includes a small rigid substrate 52, which is partially encapsulated during the over-molding of an elastomer portion 54 which defines the duckbill portion 54A and slit 54B, as shown in FIG. 5. The rigid substrate 52 has a center opening 56 defined therein, through which fluid passes. The substrate 52 has an outer circular peripheral surface 52A which includes a shoulder 52B defined by a reduction in the outer diameter of the substrate. In other embodiments, non-circular geometries could alternatively be employed. A gland seal geometry 54C is also molded onto the part during the duckbill over-mold procedure. This gland seal 54C is designed to make a fluid tight seal against the inside surface of the boss that accepts the valve. The seal is glandular, similar to an o-ring, and is formed about the periphery of the substrate 52 at the shoulder 52B.

Figure 6:
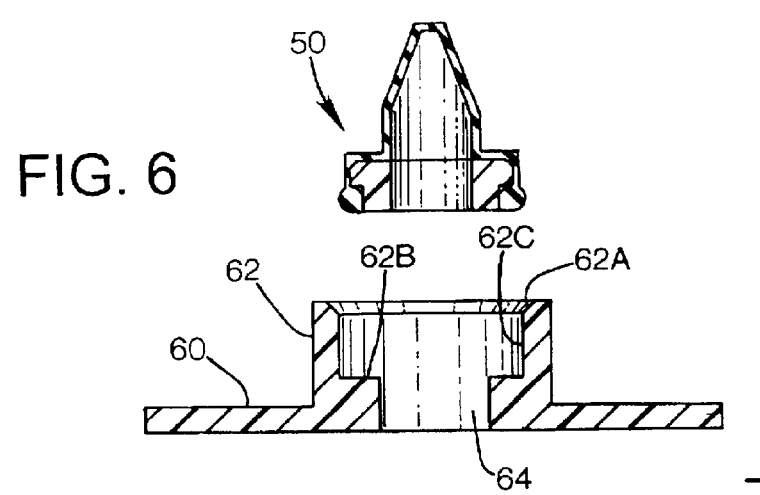
FIG. 6 is a side cross-section view of the structure of FIG. 4 poised above a host part in which the structure is to be assembled.
Figure 7:
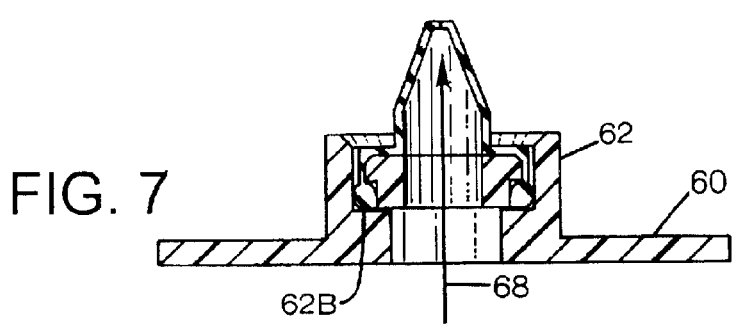
FIG. 7 is a side cross-section view, showing the check valve structure and host part of FIG. 6 in an assembled condition.

FIGS. 6–7 illustrate assembly of the duckbill check valve structure 50 into a host part 60. The part 60 includes an upstanding boss structure 62 having an opening 64 formed there through to receive the valve structure 50. The boss structure has a generally cylindrical configuration, with a bevel 62A at its distal end to facilitate insertion of the valve structure. FIG. 6 shows the structure 50 poised above the boss 62 prior to insertion. FIG. 7 shows the structure 50 press-fitted into the opening 64, with the gland seal 54C providing a fluid seal against the wall 62C of the boss. The check valve structure 50 will allow fluid flow in the direction of arrow 68 when the break pressure is exceeded, and prevent fluid flow in the direction opposite the arrow 68.

The boss 62 can include a shoulder surface 62B to provide a stop surface against which the valve structure 50 is seated. This can provide an additional sealing surface for contacting the gland seal 54C. Alternatively, the shoulder surface is omitted, and the seal is formed by the gland seal against the boss wall.

Figure 8:
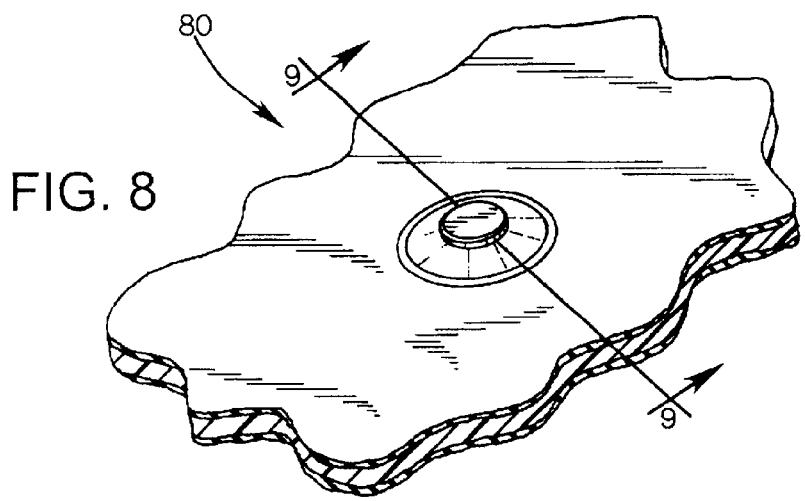
FIG. 8 is an isometric view of an embodiment of an over-molded disk check valve structure.
Figure 9:
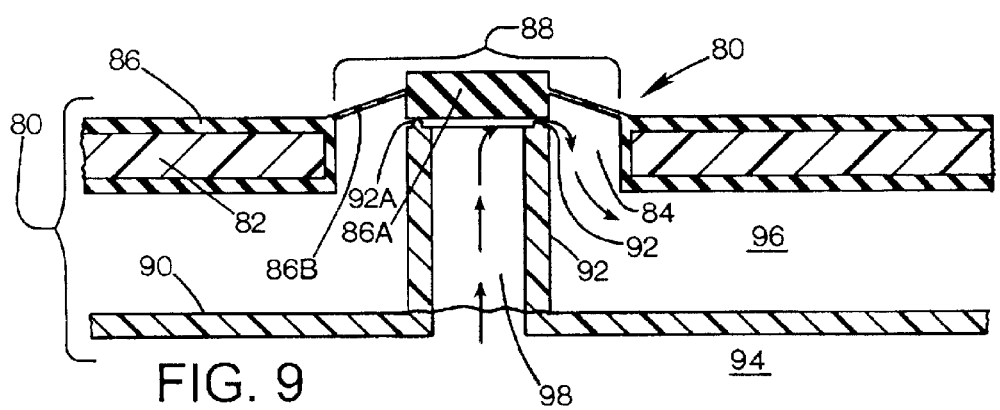
FIG. 9 is a cross-section view taken along line 9—9 of FIG. 8.

A third exemplary embodiment is an over-molded disk valve structure 80 illustrated in FIGS. 8–9. Disk valves are commonly used as check valves. A disk valve usually includes three parts, an elastomer disk, a host part with a rigid sealing surface, and a second host part that compresses the disk against the sealing surface on the first host part. This disk geometry can, in accordance with an aspect of this invention, incorporate over-molding to reduce part count and to minimize assembly.

The over-molded disk valve structure 80 includes a rigid substrate 82 having a through hole 84. The substrate is over-molded with an elastomeric layer 86 defining a membrane portion 88. The membrane portion contains a disk geometry 86A that is suspended over the hole 82 in the substrate via a thin web 86B of elastomer. The disk 86A in this embodiment is formed by the elastomer, of a thicker layer of the elastomer than the thickness of the web 86B. Alternatively, the disk 86A could be formed from a rigid material, which is over-molded by the elastomer material during the over-molded process.

A second rigid part 90 is positioned on the inlet side of the valve structure, and includes an upstanding boss portion 92 which defines a fluid conduit 98. The boss portion has a distal end 92B which enters the opening 84 to form the valve inlet. The boss portion has a raised half toroid surface at its distal end that creates a sealing ring or valve seat 92A. The valve seat is pressed up against the disk portion 86A to create a seal, with the elasticity of the membrane biasing the disk portion against the valve seat to close the valve. When an adequate pressure difference is experienced across the two sides of the disk portion, the force created by the pressure gradient forces the disk away from the inlet, i.e. away from the sealing ring 92. This displacement allows fluid to flow through the fluid conduit from chamber 94 to chamber 96.

Figure 10:
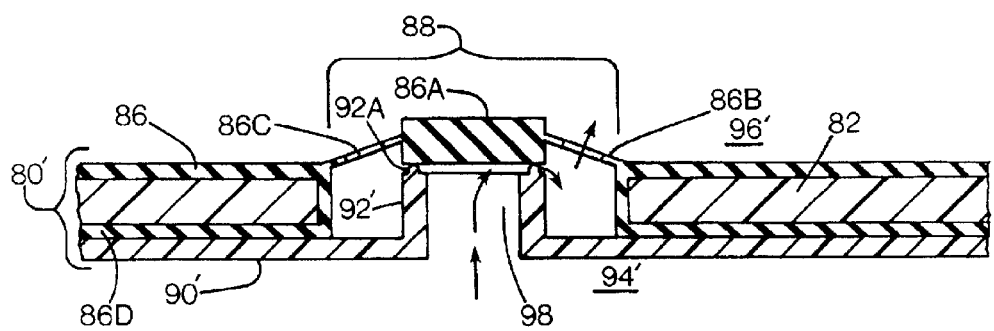
FIG. 10 is a cross-section view of an alternate embodiment of a disk check valve structure.

Alternate disk valve arrangements can be employed using the over-molding technique. For example, disk valve structure 80' is illustrated in the cross-sectional view of FIG. 10. In this embodiment, the web portion 86B has through holes 86C formed therein. The substrate member 90' is positioned in sealing contact with the lower over-molded layer 86D of the elastomeric material which forms the membrane structure 88. The valve 80' permits fluid flow through conduit 98 when the differential fluid pressure lifts disk portion 86A away from the seat 92A on boss portion 92', allowing fluid to flow from chamber 94' through openings 86C to chamber 96'.

Figure 11:
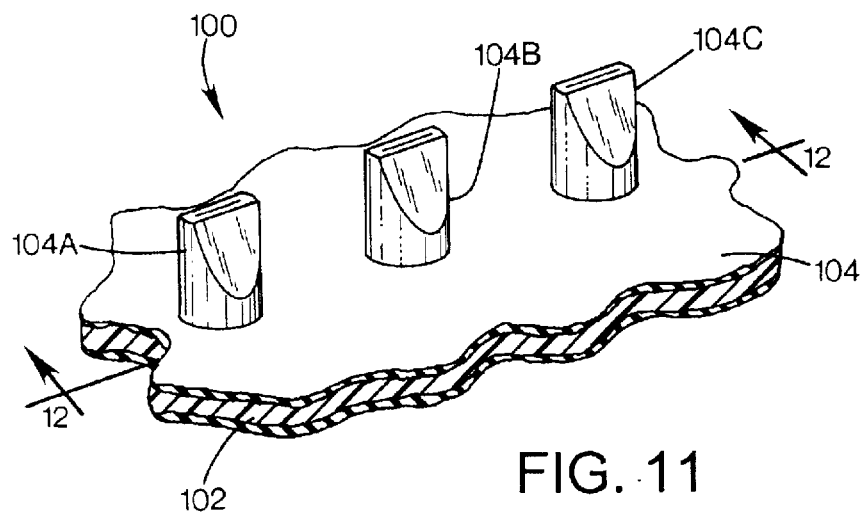
FIG. 11 is a partial isometric view of a ganged check valve structure.
Figure 12:
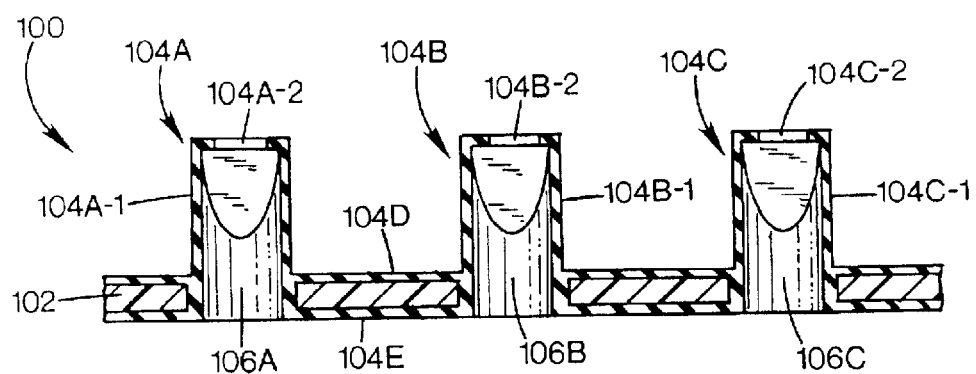
FIG. 12 is a cross-section taken along line 12—12 of FIG. 11.

The over-molding techniques can be employed to create ganged sets of valves. An exemplary ganged set 100 of over-molded valve structures is illustrated in FIGS. 11–12. As shown therein, the set 100 includes a rigid substrate 102 having a plurality of through holes 106A, 106B, 106C. An elastomeric structure 104 including layers 104D, 104E, with elastomeric valve portions 104A, 104B, 104C are over-molded onto the substrate. Each valve portion comprises a duckbill portion 104A-1, 104B-1, 104C-1, in which a slit 104A-2, 104B-2, 104C-2 is cut or lanced. Each duckbill valve portion operates in the same manner as described above regarding the valve structure 20 of FIGS. 1–3. Of course, ganged sets could be also be employed using the over-molded disk valve geometries of FIGS. 10–12, or assembled using multiple structures 50 as shown in FIGS. 4–7.

The set 100 can be employed in assemblies having multiple fluid channels and control fluid flow through the different fluid channels. Multiple valves can be formed in a single process.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An over-molded fluid control valve, comprising:
   a rigid substrate having an opening defined therein;
   a unitary valve structure fabricated of an elastomeric material, said elastomeric material over-molded onto arid over at feast a portion of the rigid substrate during a molding process to define the unitary valve structure including at least one valve portion extending over said opening, the valve portion normally closed to prevent fluid flow, the valve portion movable in response to a differential fluid pressure to allow fluid flow, wherein said valve structure includes a tapered duckbill portion having a slit formed at a distal end, and wherein the slit is normally closed against fluid flow, said slit opening in response to said differential fluid pressure, and wherein the rigid substrate has first and second opposed surfaces, and first end second layers of said elastomeric material are over-molded over said first and second opposed surfaces.

2. The valve of claim 1, wherein the first and second opposed layers are joined through the opening.

3. The valve of claim 1, wherein the elastomeric material is EPDM or a thermoplastic elastomer.

4. The valve of claim 1, wherein said differential pressure exceeds a break pressure of said valve.

5. A host part having a boss formed therein about a fluid port, further comprising a fluid control valve disposed in said fluid port to control fluid flow through said fluid port, said fluid control valve comprising an over-molded fluid control valve, comprising:
   a rigid substrate having a opening defined therein:
   a valve structure fabricated of an elastomeric material, said valve structure over-molded over at least a portion of the rigid substrate and including at least one valve portion extending over said opening, the valve portion normally closed to prevent fluid flow, the valve portion movable in response to a differential fluid pressure to allow fluid flow.

6. An over-molded fluid control valve, comprising:
   a rigid substrate having a opening defined therein:
   a unitary valve structure fabricated of an elastomeric material, said elastomeric material over-molded onto and over at least a portion of the rigid substrate during a molding process to define the unitary valve structure and including at least one valve portion extending oversaid opening, the valve portion normally closed to prevent fluid flow, the valve portion movable in response to a differential fluid pressure to allow fluid flow, wherein said valve portion comprises a membrane portion which extends over said opening, and said membrane includes a web portion which resiliently moves in response to said differential pressure and a disk portion of increased thickness; and
   a valve seat structure against which said disk portion seals in the absence of the differential pressure, preventing fluid flow, wherein said valve seat structure includes a seat member defining a half-toroidal shape.

7. An over-molded fluid control valve, comprising:
   a rigid substrate having a opening defined therein;
   a unitary valve structure fabricated of an elastomeric material, said elastomeric material over-molded onto and over at least a portion of the rigid substrate during a molding process to define the unitary valve structure including at least one valve portion extending over said opening, the valve portion normally closed to prevent fluid flow, the valve portion movable in response to a differential fluid pressure to allow fluid flow, further comprising a gland seal disposed about an outer peripheral surface of said rigid substrate.

8. The valve of claim 7, wherein the gland seal is a unitary over-molded structure formed with said valve portion of said elastomeric material.

9. A fluid control assembly, comprising:
   a host part having a fluid port and a circumferential boss;
   an over-molded fluid control valve disposed in said circumferential boss to control fluid flow through said fluid port, the valve comprising:
      a rigid substrate having a opening defined therein;
      a valve structure fabricated of an elastomeric material, said valve structure over-molded over at least a portion of the rigid substrate and including at least one valve portion extending over said opening and normally preventing fluid flow, the valve portion movable in response to a differential fluid pressure to allow fluid flow.

10. The assembly of claim 9, further including a gland seal formed of said elastomeric material about a periphery of said rigid substrate to sealingly engage an inner surface of said circumferential boss.

11. The assembly of claim 9, wherein said gland seal forms a unitary over-molded structure with said valve portion.

12. The assembly of claim 9, wherein said valve structure includes a tapered duckbill portion having a slit formed at a distal end, and wherein the slit is normally closed against fluid flow, said silt opening in response to said differential fluid pressure.

13. An over-molded disk valve for fluid flow control, comprising:
   a rigid substrate having a opening defined therein;
   a valve seat structure defining a valve seal, the valve seat structure disposed in or adjacent the opening;

a valve structure fabricated of an elastomeric material, said valve structure over-molded over at least a portion of the rigid substrate and including a membrane portion extending over said opening, the membrane portion normally in sealing contact against said valve seal, the membrane portion movable in response to a differential fluid pressure to allow fluid flow.

14. The disk valve of claim 13, wherein said valve seat structure includes a fluid conduit having a fluid port circumscribed by said valve seal, the fluid portion normally closed by said membrane portion in the absence of said differential pressure.

15. The disk valve of claim 14, wherein the membrane portion includes one or more openings formed therein, and wherein fluid flows through said one or more openings when said membrane portion is moved to open said fluid portion by said differential pressure.

16. A ganged set of fluid control valves, comprising:
a rigid substrate having a plurality of openings defined therein:
a valve structure fabricated of an elastomeric material, said valve structure over-molded over at least a portion of the rigid substrate and including at least one valve portion extending over each of said plurality of openings, each valve portion normally closed to prevent fluid flow, the valve portion movable in response to a differential fluid pressure to allow fluid flow.

17. The set of claim 16, wherein each said valve portion includes a tapered duckbill portion having a slit formed at a distal end, and wherein the slit is normally closed against fluid flow, said slit opening In response to said differential fluid pressure.

18. The set of claim 17, wherein the rigid substrate has first and second opposed surfaces, and first and second layers of said elastomeric material are over-molded over said first and second opposed surfaces.

19. The set of claim 18, wherein the first and second opposed layers are joined through each of said plurality of openings.

20. The set of claim 16, wherein the elastomeric material is EPDM or a thermoplastic elastomer.

* * * * *

UNITED STATES PATENT AND TRADEMARK OFFICE
CERTIFICATE OF CORRECTION

PATENT NO. : 6,834,677 B2
DATED : December 28, 2004
INVENTOR(S) : Barinaga et al.

It is certified that error appears in the above-identified patent and that said Letters Patent is hereby corrected as shown below:

Column 5,
Line 33, delete "arid" and insert therefor -- and --, and delete "feast" and insert therefor -- least --.

Column 6,
Line 7, before "including", delete "and".

Column 8,
Line 10, delete "In" and insert therefor -- in --.

Signed and Sealed this

Fifth Day of July, 2005

JON W. DUDAS
*Director of the United States Patent and Trademark Office*